(12) United States Patent  
Hunt

(10) Patent No.: US 7,879,117 B2
(45) Date of Patent: Feb. 1, 2011

(54) TREATMENT OF COAL

(75) Inventor: Larry Hunt, Coral Springs, FL (US)

(73) Assignee: Saudi American Minerals Inc., Coral Springs, FL (US)

( * ) Notice: Subject to any disclaimer, the term of this patent is extended or adjusted under 35 U.S.C. 154(b) by 1312 days.

(21) Appl. No.: 11/344,179

(22) Filed: Feb. 1, 2006

(65) Prior Publication Data

US 2006/0123698 A1 Jun. 15, 2006

Related U.S. Application Data

(63) Continuation of application No. 10/207,792, filed on Jul. 31, 2002, now abandoned, which is a continuation of application No. 09/704,738, filed on Nov. 3, 2000, now Pat. No. 6,447,559.

(60) Provisional application No. 60/163,566, filed on Nov. 5, 1999.

(51) Int. Cl.
*C10L 5/00* (2006.01)
(52) U.S. Cl. .......................................... 44/621; 44/626
(58) Field of Classification Search .................. 44/550, 44/551, 592, 621, 626
See application file for complete search history.

(56) References Cited

U.S. PATENT DOCUMENTS

| 3,565,827 | A | | 2/1971 | Friday |
| 3,976,597 | A | | 8/1976 | Repik et al. |
| 3,985,516 | A | | 10/1976 | Johnson et al. |
| 4,052,168 | A | | 10/1977 | Koppelman ................... 44/608 |
| 4,200,495 | A | | 4/1980 | Liss et al. ...................... 48/210 |
| 4,437,862 | A | | 3/1984 | Whang |
| 4,725,337 | A | | 2/1988 | Greene ........................ 44/626 |
| 5,254,139 | A | | 10/1993 | Adams |
| 5,468,265 | A | | 11/1995 | Adams |
| 6,057,262 | A | | 5/2000 | Derbyshire et al. .......... 502/423 |
| 6,447,559 | B1 | * | 9/2002 | Hunt ........................... 44/550 |

FOREIGN PATENT DOCUMENTS

JP 60168792 9/1985

* cited by examiner

*Primary Examiner*—Cephia D Toomer
(74) *Attorney, Agent, or Firm*—Nixon & Vanderhye

(57) ABSTRACT

Process for treating coal to enhance its rank, wherein the temperature of the material is gradually increased in a controlled set of atmospheres, to allow for the reduction of surface and inherent moisture and the controlled reduction of volatile matter while maintaining the coal's natural structural integrity. The process reduces the time, capitalization, and production costs required to produce coal of enhanced rank, thus substantially increasing the cost effectiveness and production rate over prior processes.

18 Claims, 2 Drawing Sheets

_US 7,879,117 B2_

TREATMENT OF COAL

This application is a continuation of application Ser. No. 10/207,792, filed Jul. 31, 2002, abandoned, which is a continuation of application Ser. No. 09/704,738, filed Nov. 3, 2000, U.S. Pat. No. 6,447,559, which claims priority to U.S. provisional Application No. 60/163,566 filed Nov. 5, 1999, the entire content of these applications are incorporated herein by reference.

TECHNICAL FIELD

The present invention relates to treating biomass in order to enhance its value or rank. More particularly, the invention provides a process for the treatment of coal or other biomass to efficiently convert the selected raw feed stock from low rank into a high-grade fuel capable of increased heat release per unit of fuel. This invention is particularly targeted to serve the utility, commercial and industrial markets. It is also very capable of supplying a low smoke fuel for domestic use, such as home heating and cooking use.

BACKGROUND OF THE INVENTION

Biomass is one of the largest and most readily available energy sources known to man. Biomass is found in immature forms, such as wood, shells, husks and peat. Vast amounts of biomass are also available in the form of lignite, sub-bituminous, bituminous and anthracite coal. Man has been releasing the energy trapped in the aforementioned materials ever since he discovered and was able to master fire. The inefficient release of these vast energy reserves, however, has resulted in a degradation of the quality of the atmosphere and the environment. The increasing demand for energy, created by man's insatiable appetite for the products made available by an industrialized society, have created a need to release this energy in a safe. clean and environmentally responsible manner.

Prior processes have recognized that heating coal removes the moisture and, as a result, enhances the rank and BTU production of the coal. It is also known that this pyrolysis activity alters the complex hydrocarbons present in coal to a simpler set of hydrocarbons. This molecular transformation results in a more readily combustible coal. Processes have been developed using high temperature (in excess of the coal's auto-ignition point). This high temperature art requires the control of the atmosphere in which this heated coal is treated in order to eliminate the auto-ignition of the coal. However, these high temperature, atmosphere-controlling devices produce an unstable product. The "shocked or face powdered" coal produced in these furnaces created a need to reassemble this treated material into a manufactured form (briquette). Processes were then developed which include grinding of the coal into a material less than 3/16" (fines). These fines are pyrolyzed to reduce the moisture and volatile matter, usually at temperatures ranging from 400 F to 700 F. These fines are then mixed with a binder, which is either inherent or foreign to the process. The resulting mixture is formed into predetermined sized briquettes. The resulting briquettes are low or void of moisture, modestly stable and devolatilized to some degree.

These prior processes require from 2 to 6 hours to complete. They are slow and costly, both in capitalization costs and production costs. A need exists for an improved process for treating coal to increase its rank while reducing the time and cost of completing the process. The present invention seeks to fulfill that need.

SUMMARY OF THE INVENTION

It has now been discovered, according to the present invention, that it is possible to treat coal or other biomass under conditions and over a relatively short time period to enhance its rank to produce a fuel of 12,500 to 13,000 BTU/lb content or higher. In accordance with one aspect, the invention provides a process for treating biomass, typically coal, to increase its rank, wherein a biomass feedstock is heated to remove moisture and volatiles from the feedstock, and the treated biomass is thereafter collected. The term "remove moisture" as used herein, means that the contents of moisture (water) is reduced to less than 2% by weight. The reduction of volatile material and organic hydrocarbons is a controlled part of the process whereby the time of exposure, the temperature, and the atmospheric conditions are all predicated upon the volatile makeup of the initial feed stock and the desired volatile makeup of the finished product. This finished product can be 25% by weight or greater volatile matter, for example 25-35%, or 3% or less by weight volatile matter, more usually 5-15% by weight. The present invention provides for detailed control over the end result of the raw feed stock with regard to the volatile matter and other characteristics of the final product.

In a further aspect, a portion of the steam and volatiles removed during the heat treatment of the feedstock in a heating means are recycled back into the heating means, along with a predetermined mixture of liquid hydrocarbons, to provide a non-oxidizing atmosphere which will prevent ignition of the feedstock during the heating step. The term "non-oxidizing atmosphere", as used herein with respect to the entire treatment process, means an atmosphere wherein the oxygen content is typically less than 2% oxygen, usually 0.001-1% oxygen, more usually 0.25 to 0.75% oxygen, by volume.

In yet a further aspect there is provided coal of increased rank produced according to the process of the invention.

In yet another aspect, the invention provides briquettes formed from coal treated according to the process of the invention. The briquettes may be provided with a waterproof coating to improve stability, ignition properties and to extend shelf life.

The process of the invention allows for the controlled volatilization and removal of moisture and organic volatiles, while maintaining the majority of the biomass' natural structural integrity, with reduced disintegration to powder form, thereby converting low grade fuel of, for example, 7500 BTU/lb. or less, into high-grade fuel of 12,500 BTU/lb. or higher. The process greatly reduces capitalization and production costs required to arrive at the desired result, thus substantially increasing the cost effectiveness and production rate over prior processes. This invention also greatly reduces the time necessary to complete the process from the existing processes of hours to 15 minutes or less, more usually 5-10 minutes.

BRIEF DESCRIPTION OF THE DRAWING

Embodiments of the invention will now be described in more detail with reference to the accompanying drawings, in which.

It will be noted that this invention is not limited to the use of a rotary retort, as there are other types of equipment that are also capable of supporting this invention. However, for purposes of description, the rotary retort is referred to in the description which follows.

DETAILED DESCRIPTION OF PREFERRED EMBODIMENTS

It is understood that the present invention can be used on all types of biomass substrate. Biomass for purposes of the present invention means any form of wood, shells, husks, peat and other combustible material of organic origin. Examples of biomass particularly suitable for use in the present invention are lignite, sub-bituminous coal, bituminous coal and anthracite coal. For ease of discussion, the following description will be with reference to coal, which is understood to include all forms of coal, especially lignite, sub-bituminous, bituminous and anthracite coal.

Figure 1:
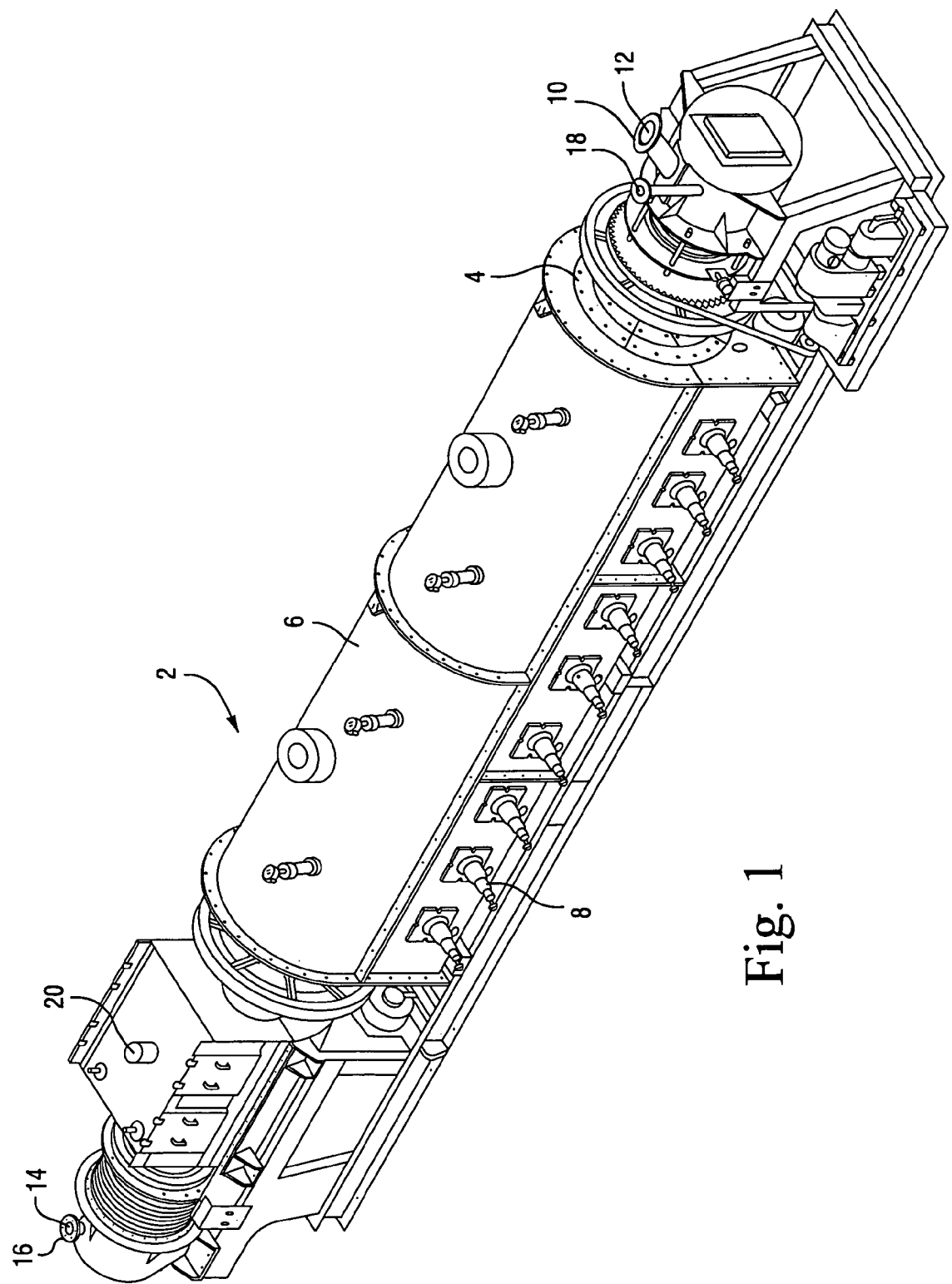
FIG. 1 is a typical retort used for carrying out the process of the invention.

Referring to FIG. 1, there is shown a conventional retort 2 for carrying out an embodiment of the invention. The process may be carried out using a cylindrical rotating retort or a rotary hearth continual moving grate-type furnace. For ease of description, the following discussion is with respect to the cylindrical rotating retort type. The retort is typically inclined at a small angle to the horizontal, usually 5-15 degrees to the horizontal, to facilitate gravitational movement of the coal being treated through the apparatus, although horizontal retorts may also be used, if desired. The retort 2 is provided with a chamber 4, which may be a single chamber or may be multiple chambers. The chamber(s) is heated by way of a furnace 6 encircling the exterior of the chamber(s) 4. The furnace is provided with external heating means, such as gas burners, electric coils or coal burners 8. The chamber(s) 4 is in communication with a feedstock inlet 10 through which raw coal 12 is admitted to the chamber(s) 4, and an outlet 14 through which treated coal 16 passes for further downstream processing. As coal enters the chamber(s) 4 through inlet 10, it is heated by way of radiation from the hot walls of the chamber(s) 4 as the coal progresses through the chamber(s).

Figure 2:
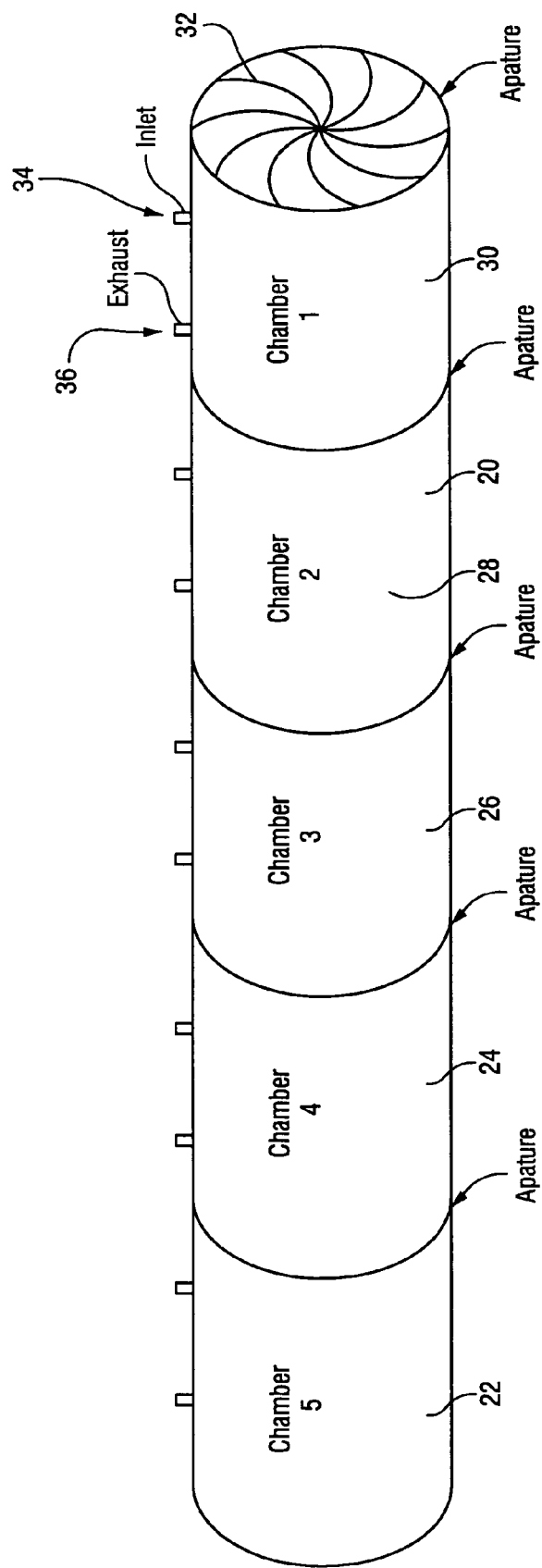
FIG. 2 is a schematic illustration of a multi-chamber retort useful in carrying out the invention.

In the embodiment illustrated in FIG. 2, the process utilizes five separate chambers. FIG. 2 shows a retort 20 having five chambers 22, 24, 26, 28, 30. Each chamber is provided with an aperture at each end to permit entry of the feedstock and exit of treated feedstock to the next downstream chamber. The chambers are each separated from each other by closure means 32, typically a shutter arrangement which can be opened and closed across the diameter of the chamber, to retain feedstock in a particular chamber under specific processing conditions which may be different and often are different from conditions present in adjacent chambers.

By removing direct contact between hot gases and the coal, it is possible to avoid combustion of the coal, while also controlling the temperature and atmospheric conditions to achieve optimum processing parameters, such as inert atmospheres created at least in part by volatilization of materials from the coal, and non-oxidizing atmospheres created by addition of vapors, such as steam or dried nitrogen, along with selected liquid hydrocarbons. The captured volatiles, which are expelled during the invention process, contain hydrocarbons. The hydrocarbons for example have formulae ranging from $CH_4$ to $C_8H_{18}$. There are times that the carbon fraction can be as high as $C_{25}$. The hydrocarbons being expelled and the quantities of expelled hydrocarbons that are available for reissue into the heated chamber during the invention process will determine the hydrocarbon formulae and the hydrocarbon quantity needed to adequately supplement the heating chamber's atmosphere. The correct atmosphere formulation required to produce the desired volatile expulsion rate and volatile expulsion amount is predicated upon the characteristics of the raw feedstock and the targeted condition of the product as it exits each chamber of the invention.

The chamber(s) 4 is provided with entry and exit port means 18, 20 for admission of gases and liquid hydrocarbons for controlling the atmosphere, as well as cooling gases. Similar entry and exit ports 34, 36 are present in the retort illustrated in FIG. 2. The chamber(s) may be modified to remove internal augers and stirring devices to afford simple reliable operation. The retort is provided with conventional devices for controlling the flow rate and temperature of the gases passing through the system. The retort is also provided with means 22 for rotating the chamber(s) 4 to permit more even distribution of heat and passage of gases throughout the coal substrate during the treatment process.

It is desirable to subject the coal feedstock to a preliminary drying stage prior to crushing. Typically, most of the surface moisture of the coal, that is at least 85% by weight of the moisture, is reduced in the preliminary drying stage. The preliminary drying step is typically carried out using a conventional air-drying apparatus with air at a temperature of 200-250 F or a centrifugal type of surface moisture drying equipment. A typical drying apparatus for coarse coal may be a CMI 48 and for fine coal may be a CMI 35 or any other standard coal drying apparatus that is typically used in the coal industry. This invention is not dependent upon pre-drying the coal feed stock. However, this pre-drying step can add to the efficiency of the overall process.

Following preliminary drying, the coal is crushed using conventional crushing apparatus e.g. a Gunstock double roll crusher or a McClanahan type crusher. This crushing will reduce the feedstock to an average size of about 1-2 inches, with the top size (the largest size permitted) more usually being in the region of about 2". This is accomplished by using a 2" screen. Any coal that is too large to pass through the screen into the feed stockpile may be recycled through the crusher.

The dried crushed coal is then introduced into the first stage(s) of treatment within the chamber(s) 8 of the retort 2. The invention described herein refers to a five chamber heating facility. However, the invention process may be performed in as few as one chamber or as many as seven. The efficiency of the invention process, however, is most affective in the five chambers as described herein.

The five stages of this process can be, but are not limited to being, contained in a cylindrical rotating retort or a rotary hearth continual moving grate type furnace. Each of these heating facilities is capable of continually moving the product from one chamber to the next. These chambers are capable of controlling the inert atmospheres during the time in which the coal is present.

In the first chamber 22 (see FIG. 2), the temperature of the coal feedstock is raised to 400-750° F., more usually about 550° F., for about 2-4 minutes, more usually about 3 minutes. During this first stage of the process, any surface moisture that has survived the pre-drying step will be completely driven off of the raw feed stock. The inert moisture that is present in the feedstock will be reduced to 2-5% by weight. The resultant percentage of moisture that is present after completion of this step will be predicated upon the amount of inert moisture that was present in the raw feed stock. Some raw feedstock will begin to lose a portion of its volatile matter at the temperatures present in this first stage. However, any loss of volatiles during the first stage of the invention is insignificant. It is in the second and subsequent stages of the invention where control is exercised in the removal of volatiles from the raw feedstock.

Biomass, such as coal, contains many volatile materials, which are expelled when the coal is exposed to high temperatures. These volatile materials posses individual characteristics which differentiate them from one another, and the temperature at which these volatile materials are normally expelled from the biomass is one such differentiating characteristic. The time in which these volatile materials are normally expelled from the biomass is another such differentiating characteristic. The present invention is concerned in one aspect with the time and temperature characteristics of the volatile materials contained in the selected biomass (raw feedstock). The present invention influences certain volatiles contained within the feedstock in a manner as to allow for a uniform expulsion of a majority of these and other volatiles. For example, volatile "A", when exposed to 900° F. may be expelled from the feedstock in 10 seconds, whereas volatile "B", when exposed to 900° F. might be expelled from the feedstock in 20 seconds. The present invention introduces a hydrocarbon or mixture of hydrocarbons into the heated atmosphere surrounding the feedstock, which acts to curtail the speed with which volatile "A" is expelled. In this way, the invention controls the expulsion rate of most volatiles present in the feedstock such that the majority of the volatiles are expelled at an equal or similar rate. This "control" over the expulsion rate of volatiles allows for treatment of the feedstock while avoiding fracturing and fissuring that would routinely occur without employing this "control". The "control" is achieved by utilizing conventional testing and monitoring equipment.

The retention time of the coal in the first stage will vary depending upon the initial moisture content of the coal feedstock. The inert atmosphere inside the chamber(s) is controlled by adjusting the retention time and temperature and by the reintroduction of volatiles and liquid hydrocarbons into the chamber(s), as necessary.

In order to maintain an essentially non-oxidizing atmosphere during the treatment process, the oxygen content of the atmosphere in the first chamber, and throughout the entire treatment process, is typically less than 2% oxygen, usually 0.001-1% oxygen, more usually 0.25 to 0.75%, by volume. The temperature for the evolution of volatile gases and atmospheric agents and the reduction in product mass takes place between 400° F. and 2200° F.

According to one aspect, control of the atmosphere is partially achieved by the introduction of liquid hydrocarbons into the chamber(s). These hydrocarbons range from hydrocarbons with formulas such as $CH_4$ to $C_8H_{18}$. There are times that the carbon fraction can be as high as $C_{25}$. When these liquid hydrocarbons are introduced, the coal interacts with these hydrocarbons in a manner that promotes the molecular behavior necessary to arrive at the desired result of this invention. When the coal is heated to the aforementioned temperatures, some of the volatile matter in the coal is converted from a solid, into a liquid and eventually into a gas. The amount of volatile matter and moisture that is driven off in gaseous form is predicated on the characteristics and make-up of the raw feedstock. The gases that are released from the solid material are either recycled or liquefied and captured.

The remaining solid material expands due to its elevated temperature. The expansion of the material and the release of some if its mass result in a lump that now has fissures and voids. The natural tendency of a shocked mass at this point is to fall apart and be reduced into a face powder. To prevent this, the present invention provides for the careful and timely introduction of liquid hydrocarbons and processed (dried) nitrogen to substantially reduce disintegration of the lumps as a result of this shocking affect. This introduction of liquid hydrocarbons has a bridging affect on the fissures in the lumps and provides an adhesive on the surface and incorporated within the body of the lumps that counters the tendency of the shocked feedstock to deteriorate into the consistency of a face powder. The timing, type, and amounts of liquid hydrocarbon(s) and processed nitrogen that are introduced are carefully predetermined by a preliminary examination of the raw feedstock. This preliminary examination of the raw feedstock is done by conventional methods. The information gathered from this preliminary examination provides the necessary data that is used to determine and to produce the mixture of hydrocarbons and processed nitrogen to be employed in the process.

This hydrocarbon formula will be timely and appropriately introduced into the heating chamber(s) during the multiple stage(s) of this invention. The actual formula used to produce the proper atmosphere will include liquid hydrocarbons that range from hydrocarbons with formulas such as $CH_4$ to $C_8H_{18}$. There are times that the carbon fraction can be as high as C25. The formula which is introduced into the heat chamber(s) and the feedstock's time of exposure are predicated on, but not limited to, the volatile makeup, characteristics, and chemical makeup of the feedstock.

The treated coal from the first stage is transferred into the second chamber of the retort. In this second chamber, the temperature of the material is elevated to about 900-1100° F. for example about 1000° F. In this second stage, the feedstock relinquishes the majority of its volatile matter, i.e. greater than 80% by weight of the volatiles that are removed, are removed in the second stage. This second stage is important in that it requires a carefully controlled atmosphere mixture of liquid hydrocarbons and processed nitrogen. The second stage of the process is where the feedstock is most likely to be "shocked" into a "face powder". The coal after exposure in this second chamber(s), has survived the negative characteristics normally associated with this heat induced "shock". For some end uses, the material that completes this second stage of the process would satisfy the specifications of some end users. When this situation occurs, the second stage treated material is collected and cooled by exposing the coal to a dry cooling gas, which is typically substantially free of oxygen. The cooling gas usually has moisture content of less than 1% by weight.

The atmosphere in the second chamber is very carefully monitored, measurably supplemented, and managed with conventional gauges that are installed in the heat chamber(s). It is found that the coal typically undergoes at least some agglomeration at temperatures between 900° F. and 1100° F. and particularly at temperatures above 1100° F. For this reason, it is preferred to keep the temperature in this stage of the process generally less than 1100° F.

The coal is retained in the second chamber(s) for a period up to about 5 minutes, typically 1-4 minutes, more usually about 3.5 minutes. This phase of the process results in the expulsion of the majority of volatiles from the coal. During this phase, the coal undergoes shrinkage as the coal loses a portion of its mass. Typically, weight loss is in the range of 5-50% of the coal's initial mass, more usually a weight loss in the range of 5-25% by weight, depending upon the makeup and characteristics of the raw feed stock. One type of feed stock may not give up its volatile matter as readily as another type. A feed stock may have as much as 60% volatile matter while another may only have an initial volatile content of 15%. This invention allows for a conventional pre-process evaluation of the feed stock. The data collected from this evaluation is then used to calculate the mixture of liquid hydrocarbons and processed nitrogen that are carefully maintained within the heating chamber(s). This "custom design" processing feature allows this invention to successfully treat a variety of biomass with a variety of initial characteristics.

The atmosphere in the chamber(s) is controlled so that the coal maintains a majority of its natural structural integrity. The term "natural structural integrity", as used herein, means the tendency of the post-crushed natural lump coal (coal averaging in size from 1-2 inches) not to significantly disintegrate to form a powder. The expression "majority of its natural structural integrity", as used herein, means that more than 50% by weight, more usually 75% or more, typically 85 to 95%, of the coal does not undergo disintegration during the multiple chamber(s) process. The structural integrity possessed by the coal as a result of the invention is such that during normal handling, even though the coal is more fragile due to some loss of mass, the coal sustains its average particle size range of 1-2 inches. By carefully controlling the atmosphere in the chamber(s), the coal can be heated to as high as 2200° F. for extended periods of time to remove volatiles, without inducing substantial agglomeration, i.e. less than 10% by weight agglomeration is observed, more usually less than 8% by weight, and without significantly degrading the structural integrity of the coal. The material is now ready to be transferred into the third chamber(s) of the process.

The coal and the controlled atmosphere are transferred from the second chamber(s) into the third chamber(s), where the third phase of the process is executed. The coal in this phase is raised to a temperature of 1300-1550° F. for example about 1450° F., and retained at that temperature for about 2-4 minutes, typically about 3 minutes to produce coal having a moisture content of less than 2%. By the third stage, the moisture content has been reduced to the lowest economically feasible level possible utilizing this invention. The volatile content of the feedstock by the completion of stage 3 is typically within 10% of the targeted volatile content of the finished product. The atmosphere in the third chamber(s) is carefully monitored with conventional gauges that are installed in the heat chamber(s) and appropriately supplemented with liquid hydrocarbons and processed nitrogen in order to maintain the structural integrity of the material. For some end uses, the material that completes this third stage of the process would satisfy the specifications of some end users. When this situation occurs, the third stage treated material would be collected and processed cooled by exposing the coal to a dry substantially oxygen free cooling gas having a moisture content of less than 1% by weight. The coal and the controlled atmosphere are then transferred into the fourth chamber(s).

In the fourth phase of the present process, the temperature of the material is raised in the chamber(s) to 2000-2400° F., typically about 2200° F. for 3-5 minutes to produce coal having a moisture content of less than 2% and a volatile content of between 5-15%. The atmosphere of the fourth phase is again very critically controlled and managed with conventional gauges that are installed in the heat chamber in order for this invention to provide for the favored results. The retention time of the coal in the chamber in this stage of the process and the actual temperature required in this fourth phase are dependent upon the percentage of volatile matter to mass that is optimally desired in the finished material. This fourth stage is the final opportunity for this process to attain the desired volatile qualities requested of the finished product. In order for a feedstock that is resistant to volatile expulsion, to be brought into targeted volatile standards, the high temperatures of the fourth phase will either be elevated to produce the desired results or the exposure time of the unfinished products will be increased in order to achieve the desired results. It is possible for both temperature and exposure time to be adjusted in order to allow for a less cooperative feed stock to expel the excess volatile matter.

An objective of the present process is to reduce the percentage of volatile matter to the desired percentage as requested by the end user, which for this discussion is less than 15% by weight. At this stage in the process, the remaining volatile matter is generally composed of high boiling organic hydrocarbon materials occluded within the interstices of the coal pieces. The amount of moisture remaining after this stage is less than 2% by weight.

The coal and the controlled atmosphere are moved into the fifth chamber(s) of the apparatus where the processed coal is cooled by exposing the coal to a dry cooling gas. The cooling gas is typically a non-oxidizing gas, and may be an inert gas such as argon or may be nitrogen or other suitable non-oxidizing gas. The cooling gas is substantially free of oxygen. As used herein, the expression "substantially free of oxygen" means typically less than 2% oxygen, usually about 0.001-1% oxygen, more usually about 0.25 to 0.75% oxygen, by volume. The atmosphere in the previous chamber(s) is also substantially free of oxygen as that term is defined herein. The cooling gas is essentially dry upon admission to the chamber(s), and may be countercurrent or cocurrent to the direction of flow of the coal undergoing treatment. The cooling gas is essentially dry, having a moisture content of less than 1% by weight, typically 0.5% by weight or less. The cooling gas is typically passed over the coal at a volume flow rate of about 0.2-0.5 pounds per minute. The coal in this chamber(s) at this stage of the process is cooled at a rate which does not affecting the structural integrity of the coal.

When the material has cooled to 250° F., it may be optionally separated into fines (particles less than ¼") and coal having a size in the range of ¼" to 2". This material separation is accomplished by conventional means, using by way of a sieve or screen of appropriate mesh size.

The fines may be optionally delivered to a pelletizing or briquetting process where these 250° F. fines may be conventionally mixed with a biodegradable coating (binder and igniter) that is in a liquid state at 250° F. This mixed material is then formed into the desired sized pellet using conventional methods. If the treated coal were destined to go directly into a furnace, i.e. a utility use, this coating process would not be necessary. When the product is scheduled for conventional handling and the end user requires a material that is resistant to breakage, this coating process is employed. This coating also adds a low-level ignition point, which provides a valuable quality, especially when the end user is a domestic user.

As the newly formed pellets or briquettes cool below 150° F., they become structurally stable. This structurally stabilizing coating material adds significantly to the coal's ability to withstand disintegration due to conventional handling methods. The coating also adds a low heat ignition quality to the material, which allows the material to be easily ignited. The coating does not significantly add to the off-gases produced when the material is ignited. A further advantage, which the biodegradable coating adds to the finished product, is that the finished product is extremely moisture resistant which provides for a multi-year shelf life.

Typically the non-fines obtained via the screening process are immediately coated with the aforementioned conventional binder/igniter. This coating provides an enhanced structural integrity to the natural lump material that has been weakened in the aforementioned process, together with enhanced moisture resistance. The coated coal's reduced tendency to undergo disintegration upon handling provides for a much more marketable product as it does in the aforementioned processed pellets/briquettes. As this coated, natural lump coal cools below 150° F., it acquires the same favorable qualities as does the manufactured pellet or briquette as mentioned above.

While the invention has been described in connection with what is presently considered to be the most practical and preferred embodiment, it is to be understood that the invention is not to be limited to the disclosed embodiment, and is intended to cover various modifications and equivalent arrangements included within the spirit and scope of the appended claims.

What is claimed is:

1. A process for treating coal to increase its rank, comprising:
   subjecting the coal to a preliminary drying step to remove surface moisture;
   raising the temperature of the coal to 400-750° F. for about 2-4 minutes;
   heating the coal in a non-oxidizing atmosphere to remove substantially all moisture and a predetermined amount of from 5 to 95% of volatile matter from the coal while maintaining a majority of the coal's natural structural form and integrity, wherein said non-oxidizing atmosphere is comprised of steam and volatiles removed during heating.

2. A process according to claim 1, wherein said coal is selected from peat, lignite, sub-bituminous coal, bituminous coal and anthracite coal.

3. A process according to claim 2, wherein the treated coal has a BTU content of 12,500 BTU/lb. or higher.

4. A process according to claim 2, wherein the moisture content of the coal is reduced to about 2% by weight of the treated coal.

5. A process according to claim 2, wherein the volatile content of the treated coal is reduced to a predetermined volatile content percentage of between 5 and 30% by weight.

6. A process according to claim 2, wherein prior to heating the coal is subject to crushing to reduce the average size of the coal to 1-2 inches.

7. A process according to claim 6, wherein the preliminary drying step is carried out prior to crushing to reduce the surface moisture content.

8. A process according to claim 7, wherein the surface moisture content is reduced to about 2-4% by weight.

9. A process according to claim 6, wherein the crushed coal is subjected to a drying step by heating to a temperature in the range of 200-250° F. for a period of about 5 minutes in order to remove the surface moisture.

10. A process according to claim 9, wherein the surface moisture content is reduced to about 1-2% by weight.

11. A process according to claim 1, wherein the temperature of the coal is elevated to about 900-1100° F. for a period of about 1-4 minutes to produce coal with an inherent moisture content of less than 5% and a mass content loss of up to 50% by weight.

12. A process according to claim 11, wherein the temperature of the coal is raised to 1300-1550° F. and retained at that temperature for about 2-4 minutes to produce coal with a moisture content of 1-2% and a volatile content of 15-25%.

13. A process according to claim 12, wherein the temperature of he coal is raised to 2000-2400° F. to produce coal with a moisture content of 0-2% and a volatiles content of 5-15%.

14. A process according to claim 13, wherein the coal is cooled by exposing the coal to a dry cooling gas.

15. A process according to claim 14, wherein the cooling gas is substantially free of oxygen.

16. A process according to claim 15, wherein the cooling gas has a moisture content of less than 1% by weight.

17. A process according to claim 2, wherein said steam and volatiles removed during heating of the coal are recycled to provide a non-oxidizing atmosphere and to prevent ignition of the coal during heating.

18. A process according to claim 2 wherein said non-oxidizing atmosphere comprises nitrogen.

* * * * *